United States Patent [19]

Fiorani

[11] Patent Number: 4,906,319
[45] Date of Patent: Mar. 6, 1990

[54] APPARATUS FOR PROVIDING A LOAD WOUND BY A HEAT-SHRINKABLE FILM WITH A CARRYING HANDLE

[75] Inventor: Roberto Fiorani, Milan, Italy

[73] Assignee: Minnesota Mining and Manufacturing Company, St. Paul, Minn.

[21] Appl. No.: 247,695

[22] Filed: Sep. 22, 1988

[30] Foreign Application Priority Data

Oct. 1, 1987 [IT] Italy .............................. 22102 A/87

[51] Int. Cl.$^4$ ............................................. B32B 31/18
[52] U.S. Cl. .................................... 156/353; 156/355; 156/361; 156/522; 156/552; 53/134
[58] Field of Search ............... 156/250, 264, 289, 290, 156/353, 355, 361, 517, 519, 522, 552, 553, 554, 504; 53/134, 398, 413, 441, 442; 206/428, 432, 497; 229/52 AL; 493/321, 347

[56] References Cited

U.S. PATENT DOCUMENTS

| | | | | |
|---|---|---|---|---|
| 2,652,166 | 9/1953 | Johnson | ............................... | 156/552 |
| 3,516,892 | 6/1970 | Becka et al. | ........................ | 156/522 |
| 4,543,152 | 9/1985 | Nozaka | ............................... | 156/504 |
| 4,700,528 | 10/1987 | Bernard | .................................. | 53/398 |
| 4,716,707 | 1/1988 | Gambetti | ............................... | 53/134 |

FOREIGN PATENT DOCUMENTS 0174015 3/1986 European Pat. Off. .

Primary Examiner—Caleb Weston
Attorney, Agent, or Firm—Donald M. Sell; Walter N. Kirn; Mark A. Litman

[57] ABSTRACT

The process comprises the steps of storing a non-heat-shrinkable handle tape (15), including consecutive stripes (MA) each having a non-adhesive central portion and adhesive end portions, applying the handle tape (15) to the film (P) while this is moving along a packing machine (M) before being wound and heat-shrinked around load (F), causing the handle tape (15) be pulled by the moving film (P) by having the handle tape (15) adhering to the film (P), finally cutting the handle tape (15) separating a stripe (MA) therefrom, adhering on the film (P). Stripe (MA), applied to film (P) before this is wound and heat-shrinked around load (F), forms a handle after heat-shrinking. The apparatus (1) to perform such a process comprises a feeding unit (2), a storing unit (3) and an applying unit (4). (FIG. 1)

10 Claims, 6 Drawing Sheets

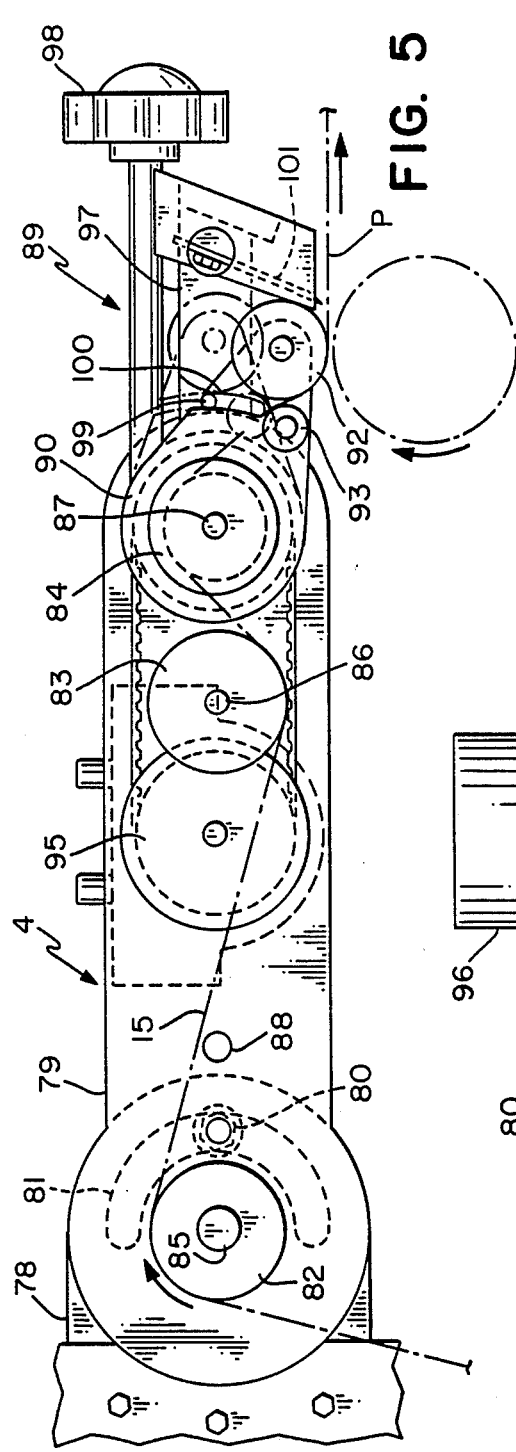
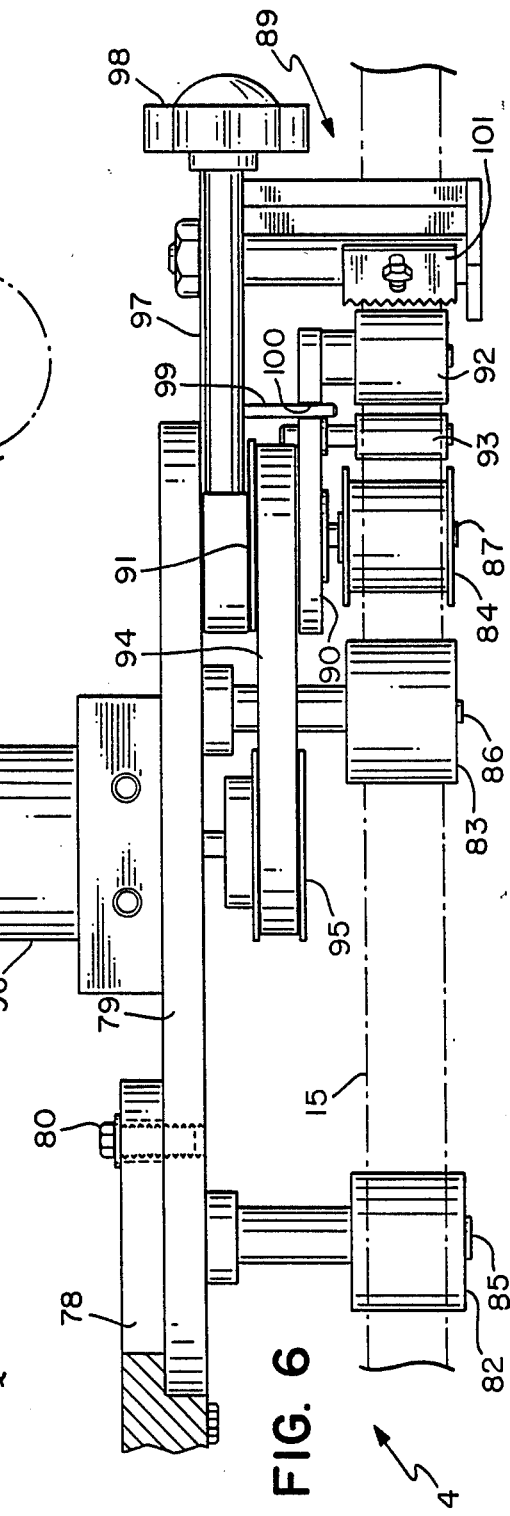

APPARATUS FOR PROVIDING A LOAD WOUND BY A HEAT-SHRINKABLE FILM WITH A CARRYING HANDLE

DESCRIPTION

1. Field of the Invention

The present invention refers to the formation of carrying handles on loads wound by a heat-shrinkable film.

2. Background of the Art

The wide-spreading of heat-shrinkable films (generally made of polyethylene) for winding packages is known; such packages may be of different type, e.g. consisting of a single piece or more frequently of many distinct pieces, merely put one near the other and kept together by the heat-shrinked film; in any case they are commonly named loads, of any type they may be, and such name will be used hereinafter in the present invention.

Sometimes, particularly in the case when the loads are intended for domestic use, each load is provided with an upper handle to allow it to be easily carried by a single hand.

A known technique to do this provides the application of a reinforcing strip onto the film before this is wound and heat-shrinked around the load. After heat-shrinking, the film is holed along the edges of the reinforcing strip such that the user can tear it and use the strip as a handle.

It can be easily understood that such technique can be employed only with particular loads (e.g. groups of bottles) where there are void spaces above which it is possible to apply the strip, thus allowing its use as a handle. In the case of loads without any void space, it would not be possible to slip the hand under the strip.

In any case, it has been seen furthermore that often the user is not aware of the possibility of tearing the film and using the strip as a handle.

A similar technique, which is described in French patent application No. 2,571,687, provides for making the holes before heat-shrinking, so that the heat-shrinking itself causes tearing of the film along the holed lines. In this way, the load has a handle ready-to-use, without any need for intervention by the user, but still the technique is not suitable if the load has not void spaces.

Another technique, which overcomes the drawbacks of the above mentioned technique, provides the application of a handle, having a central non-adhesive portion and two adhesive end portions, directly onto the load, at the end of packing. In this way, the handle can be applied on any load and results evident to the user.

If then the handle is realized by applying a paper strip to a strip of transparent adhesive tape, the paper strip can be used as a vehicle of advertising messages, this bringing about clear advantages since paper printing is much easier and cheaper than adhesive tape printing.

However, rather complicated, expensive and delicate setting-up plants are required to apply handles in the above reported way.

These plants consist of a first apparatus to make the handles and a second apparatus to apply them. This latter apparatus is extremely complicated since it must take up the handle by taking it at its ends and apply it onto the load leaving the space for hand slip; practically, such apparatus reproduces the movement which an operator would make to apply the handle manually.

An example of apparatus of this type is given in European patent application Ser. No. 0174015.

Due to the above mentioned drawbacks and complications, above all in case of relatively small production volumes, the manual application is very often used.

SUMMARY OF THE INVENTION

The present invention refers to a process for providing a load (F) wound by a heat-shrinkable film (P) with a carrying handle (MA), comprising the steps of:

storing a non-heat-shrinkable handle tape (15) comprising a series of consecutive stripes (MA) each having a non-adhesive central portion and adhesive end portions, applying the handle tape (15) to the film (P) while the film is moving along a packing machine (M) before being wound and heat-shrinked around the load (F), causing the handle tape (15) be pulled by the moving film (P) by having the handle tape (15) itself adhering to film (P), cutting the handle tape (15) separating a stripe (MA) therefrom, adhering on the film (P).

In this way, the handle application results very easy since consisting of laying down a (partially adhesive) tape stripe onto a flat film.

The space between the film and the tape will be obtained later by heating which causes shrinking of the film and not of the tape; consequently, the tape stripe, after heat-shrinking, forms a handle.

Any adhesive tape, which has not any heat-shrinking characteristics, e.g. a polyester or polypropylene adhesive tape, can be used to the purposes of the present invention.

The non-adhesive central portion of each stripe can be advantageously obtained by applying a paper strip onto the adhesive tape, in a per se known way.

Preferably, for performing such method, an apparatus can be used for applying non-heat-shrinkable tape stripes (MA) each having a non-adhesive central portion and adhesive end portions to a heat-shrinkable film (P) moving along a packing machine (M), said film (P) being intended to be subsequently wound and heat-shrinked around loads (F) for which said stripes are intended to constitute respective carrying handles, comprising:

a feeding unit (2), including a support frame (5), means (6-14 and 16-29) for providing a handle tape (15) comprising a series of consecutive stripes (MA), means (59-60) which define a motion path of the handle tape (15), and drive means (36-45) for pulling the handle tape (15) along its motion path, a storing unit (3), in which the handle tape (15) fed along its motion path on the feeding unit (2) is received, including a support frame (61), means (63-68) which define a motion path of the handle tape (15), and means (62 and 69-73) for detecting the amount of stored handle tape (15) and for consequently controlling the drive means of the feeding unit (2), an applying unit (4), including a support frame (78, 79), means (82-84) which define a motion path of the handle tape (15), and a head (89) for applying the handle tape (15) to the moving film (P) in such a way that the handle tape (15) is pulled by the film (P) and taken from the storing unit (3) and for cutting the handle tape (15) separating a stripe (MA) which remains adhering on the film (P) and is adapted to constitute a handle after shrinking of the film (P) itself, said head (89) on the applying unit (4) being controlled for cutting the handle tape (15) by sensing means (77) activated by passing of a stripe (MA).

DETAILED DESCRIPTION OF A PREFERRED EMBODIMENT OF THE INVENTION

Further features and advantages of the present invention will better result from the following description of a preferred embodiment, made with reference to the enclosed drawings. In such drawings:

FIG. 5 is a front view of the detail of FIG. 4;

FIG. 6 is a plan view of the detail of FIG. 4;

An apparatus 1 according to the invention is active on an initial portion A of a packing machine for loads F with a heat-shrinkable film P, made e.g. of polyethylene.

Figure 10:
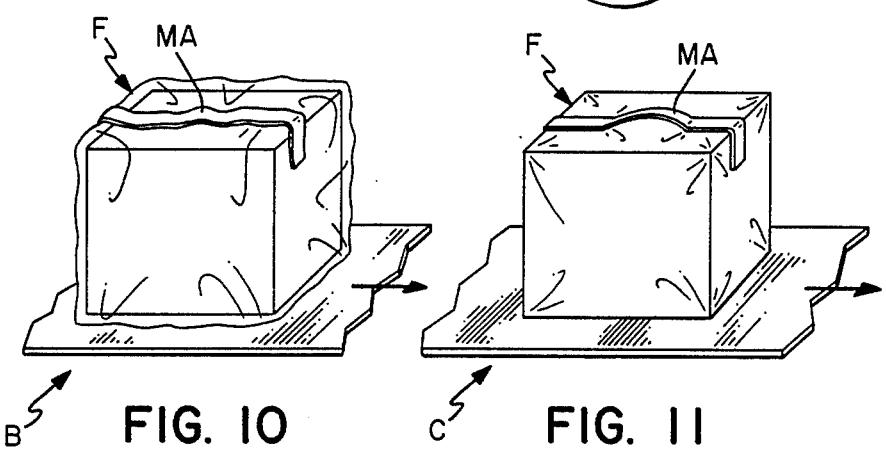
FIG. 10 is a schematic view of a load on a packing machine, between the winding step of the heat-shrinkable film and the heat-shrinking step.
Figure 11:
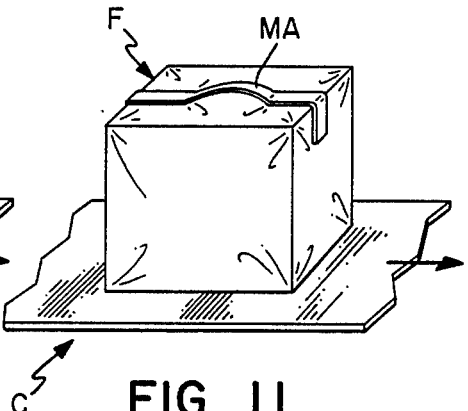
FIG. 11 is a view of the load of FIG. 10 after the heat-shrinking step.

The packing machine is not a part of the present invention and therefore it is not described; in FIGS. 10 and 11 there are respectively shown an intermediate portion B where load F has been wound with film P and a final portion C where film P has been heat-shrinked and load F is ready.

The apparatus 1 comprises three basic units: a feeding unit 2, a storing unit 3 and an applying unit 4.

The feeding unit 2 comprises a support frame essentially consisting of a vertical plate 5; such plate 5 is provided with per se conventional support means (not shown) according to the way it is mounted (hanged, leant, screwed, etc.).

The feeding unit 2 comprises a support 6 for a roll 7 of paper tape 8 and a support 9 for two rolls 10 of non-heat-shrinkable adhesive tape 11, e.g. of polyester; the rolls 10 are not used at the same time, but only one at a time, alternatively, the other one being a reserve. Supports 6 and 9 are mounted on plate 5, such that rolls 7 and 10 are substantially vertical and perpendicular to plate 5, to limit the dimensions of apparatus 1 on the plane of plate 5 itself.

On plate 5, correspondingly to rolls 7 and 10, there are respectively provided photocell sensors 12 emitting a light beam which normally is shut out by the rolls. The position of the sensors 12 is such that, when an unwinding roll reaches a given pre-set minimum diameter, the light beam is no more shut out and reaches a reflecting plate 13 thus causing the emission of a signal.

On plate 5 there are provided guiding means defining a motion path of the paper tape 8 and a motion path of the adhesive tape 11.

Both above mentioned motion paths lead to a coupling station 14 of tapes 8 and 11, where a handle tape 15 is obtained (as better explained hereinafter) in which non-adhesive portions (stripes of paper tape 8 coupled with the adhesive tape 11) are alternated with adhesive portions.

Further guiding means mounted on plate 5 define a motion path of handle tape 15 towards storing unit 3.

More in particular, the motion path of paper tape 8 is defined by two rollers 16 and 17 on support 6, a pin 18 placed at 45° with respect to plate 5 to deviate the path itself of 90° and four rollers 19, 20, 21 and 22, mounted on plate 5, which give the path a zigzag progress.

Roller 16 is mounted at the end of an arm 23, which can move with respect to support 6 and is provided with elastic and damping means (not shown), to stretch the paper tape 8 and absorb the irregularities during working.

All above said rollers 16, 17 and 19–22 are mounted idle on their respective pins.

Pin 18 is of the air-cushion type, where a plurality of small holes (not shown) on the surface of the pin itself are fed with pressurized air to reduce the sliding friction of the tape on the pin itself.

The motion path of the adhesive tape 11 is defined by two rollers 24 and 25 on support 9 (one for each roll 10), two air-cushion pins 26 and 27 (one for each roll 10) placed at 45° with respect to plate 5 to deviate the path itself of 90°, and two rollers 28 and 29 which give the path a zigzag progress. All above mentioned rollers 24, 25, 28, 29 are mounted idle on respective pins, not shown in the figures.

Roller 29 has an anti-adhering external surface, since it has to be in contact with the adhesive side of tape 11 without sticking thereto.

The coupling station 14 of tapes 8 and 11 comprises a support roller 30 and a rocker 31 on which there are mounted an applying roller 32 and a pressing roller 33. Paper tape 8 is made to pass between applying roller 32 and pressing roller 33 with which it is always in contact.

The rocker 31 is rotatively mounted on the same pin of roller 22 and is angularly movable between a coupling position, wherein the applying roller 32 is pressed against the supporting roller 30 coupling the two tapes 8 and 11, and a rear position, wherein the applying roller 32 is spaced-out from roller 30.

Near rocker 31 there is mounted a registerable brake bumper 34 against which roller 32 is pressed when rocker 31 is in the rear position, to hold the paper tape 8.

The coupling station of tapes 8 and 11 furthermore comprises cutting means for tape 8, consisting of a blade 35 fixed on plate 5 near roller 30 and a couple of driving rollers 36 and 37.

Roller 37 is motor-driven being rotatively integral with a toothed pulley 38, on the opposite side with respect to plate 5, coupled to an electric geared motor 39 through a toothed belt 40; an idle pulley 41 which may be registerably placed with respect to plate 5 keeps the belt in tension.

Roller 36 is idle mounted on a lever 42, pivoted to plate 5; a pneumatic cylinder 43 is applied to lever 42 to move roller 36 from a working position in substantial contact with roller 37 to a spaced-out rest position and viceversa.

Rollers 36 and 37, in the working position, are mutually engaged by means of respective crown gears 44 and 45.

The coupling station further comprises means for moving rocker 31 from the rear position to the coupling position and viceversa. Such means comprise a follower roller 46 idle mounted on rocker 31, on the opposite side of rollers 32 and 33 with respect to the pin of roller 22; to rocker 31 there is furthermore hooked a spring 47 to keep the follower roller 46 in contact with the surface of a rotating cam 48.

Cam 48 rotates in synchronism with feeding roller 37 by means of two toothed pulleys 49 and 50 solidly fixed to cam 48 and roller 37, respectively, and connected to a toothed belt 51; a pulley 52 works as a belt stretcher.

Cam 48 comprises a lowered or minor radius portion 53, a projecting or major radius portion 54 and two connecting portions 55 and 56.

The engagement of roller 46 on the lowered portion 53 corresponds to the connection position of rocker 31, while the engagement of roller 46 on the projecting portion 54 corresponds to the rear position of rocker 31.

Advantageously, cam 48 is of the registerable type to allow the width of portions 53 and 54 to be varied. In particular, cam 48 comprises two discs 57 and 58 placed side by side, secured one to the other with per se known removable means such as screws, bolts and the like; the shape of every disc 57 or 58 is like the global shape of cam 48, with the projecting portion having the shortest size.

By registering the relative angular position of the two discs 57 and 58 a cam 48 can be obtained which has a length of the projecting portion 53 varying from a lowest value, equal to the size of the projecting portion of discs 57 and 58, to a highest value, equal to twice such a size.

The motion path of the handle tape 15 is defined by two rollers 59 and 60. Roller 60 has an anti-adhering outer surface since it must be in contact with the partially adhesive side of tape 15 without sticking thereto. Handle tape 15 is driven along such motion path by the motor-driven means defined by rollers 36 and 37 and by all elements, already described, shown with numbers from 38 to 45.

The storing unit 3 comprises a supporting frame substantially consisting of a vertical plate 61.

In the apparatus 1 as shown, plate 61 is integral and coplanar with plate 5 of the feeding unit 2; it is evident, however, that units 2 and 3 may be also separated and a guiding path for the tape be provided between them.

Unit 3 comprises a plurality of stationary rollers and a plurality of movable rollers, mounted on a slide 62, which can freely move vertically along plate 61. For instance, unit 3 comprises three stationary rollers 63, 64, 65, mounted on plate 61 by means of respective pins, and three movable rollers 66, 67, 68, mounted on slide 62 by means of respective pins. Rollers 63, 64, 65 have an anti-adhering outer surface since they must be in contact with the partially adhesive side of tape 15 without sticking thereto.

In the storing unit 3, tape 15 follows therefore a generally sinusoidal feeding path defined by rollers 63-68 with upward loops around rollers 63, 64 or 65 and downward loops around rollers 66, 67 and 68. It is worth noting that roller 60 of unit 2 is substantially aligned with rollers 63, 64 and 65.

The stored quantity of the handle tape 15 is detected by four sensors 69, 70, 71 and 72, registerably secured to plate 61 along a vertical slit 73, which detect the position of slide 62.

An outlet roller 74 is registerably secured to plate 61 along a vertical slit 75. In another vertical slit 76 in plate 61 there is registerably secured an optical sensor 77 capable of "detecting" the presence of the paper tape portions 8 on the adhesive tape 11, according to the way which will be clear hereinafter.

All elements 74–77 may be placed in the applying unit 4, instead of the storing unit 3, all the more that they are functionally bound to unit 4, as explained hereinafter. In the apparatus 1, proposed as an example, they have been placed in unit 3 merely for reasons of space, having been preferred to have an extremely compact unit 4 such that the advantages of the invention could be as much as possible in evidence.

The applying unit 4 comprises a substantially half-circular supporting plate 78, solidly and coplanarly fixed to plate 61.

To plate 78 there is hinged an arm 79, substantially coplanar to plate 61; arm 79 can be fixed to plate 78 in different angular positions by means of a screw 80 engaging in a curve slit 81. In the shown apparatus 1, the possible movement of arm 79 with respect to plate 78 comprises an angle of about 180°.

On arm 79, there is provided a motion path for the handle tape 15 defined by a plurality of idle rollers, in particular three rollers 82, 83 and 84 mounted on respective pins 85, 86 and 87.

According to the chosen position of arm 79, other rollers may be necessary to improve the motion path of tape 15; to this purpose, arm 79 is provided with seats 88 for housing the additional rollers.

Arm 79 carries an applying head 89, comprising a bar 90 integral with a toothed pulley 91 idle-mounted on pin 87. Bar 90 carries a couple of rollers 92 and 93, of which the bigger roller 92 has an elastically yielding outer surface, made for instance of rubber.

A toothed belt 94 connects pulley 91 with a driving pulley 95, moved by a per se known pneumatic actuator 96.

Bar 90 thus results to be movable angularly between a lowered and a raised position.

Head 89 then comprises a small arm 97, mounted on pin 87 with conventional means, e.g. a knob 98. Small arm 97 carries a brake bumper consisting of a small stake 99 having a high-friction outer surface; in the raised position of bar 90, stake 99 strikes roller 93 thus locking it; to this purpose, bar 90 is provided with a passing slit 100 for stake 99. To small 97 there is fixed a projecting blade 101, near roller 92.

To apparatus 1 there is associated a control central station (not shown), housed for instance in a cabinet near apparatus 1 itself. Such a station controls motor 39 and pneumatic actuator 96 and receives the signals from all sensors (12, 69, 70, 71, 72, 77) of apparatus 1 and from the packing machine (handle request signal).

Apparatus 1 works in the following way.

Figure 1:
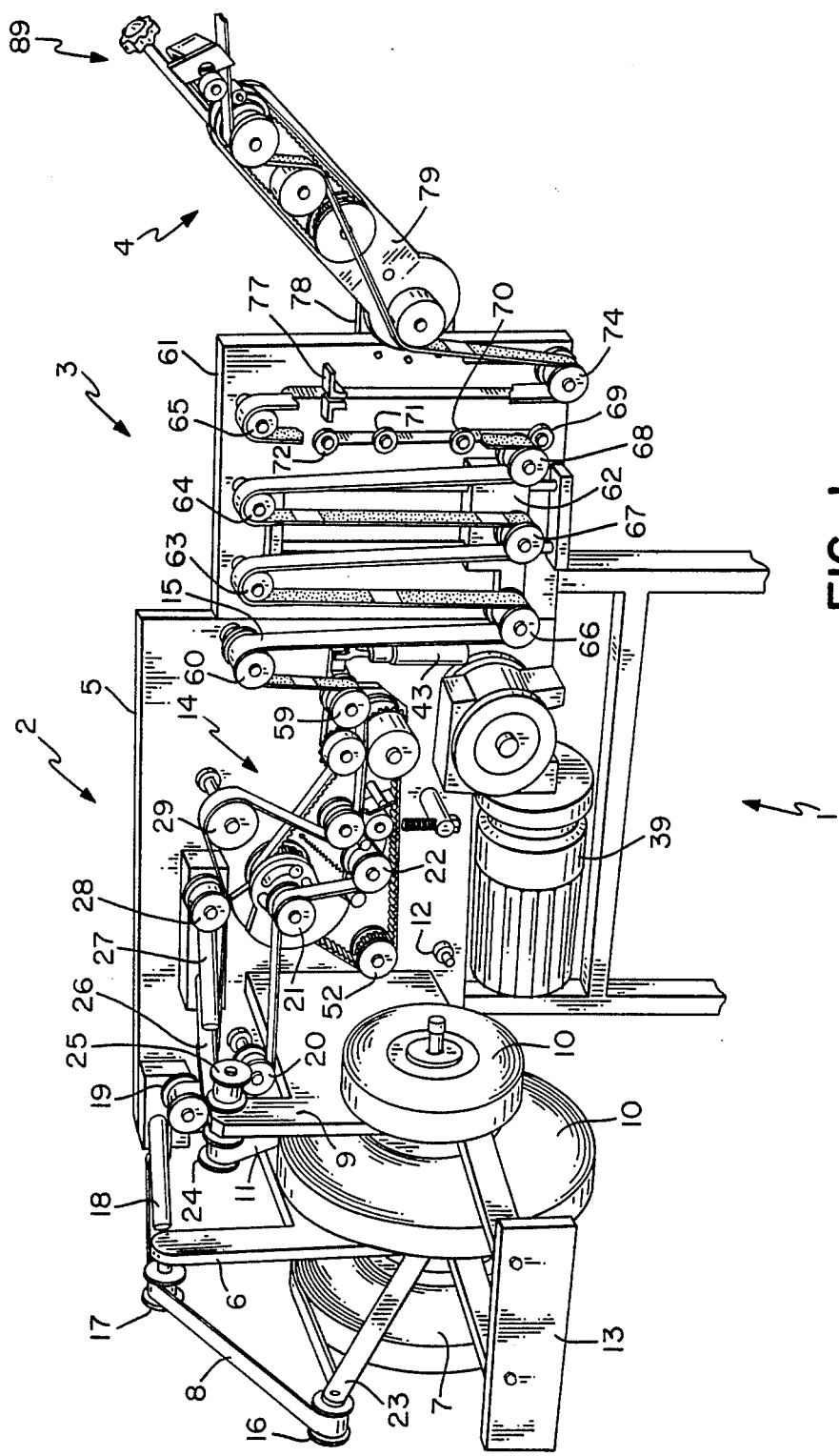
FIG. 1 is a front perspective view of an apparatus according to the invention.
Figure 2:
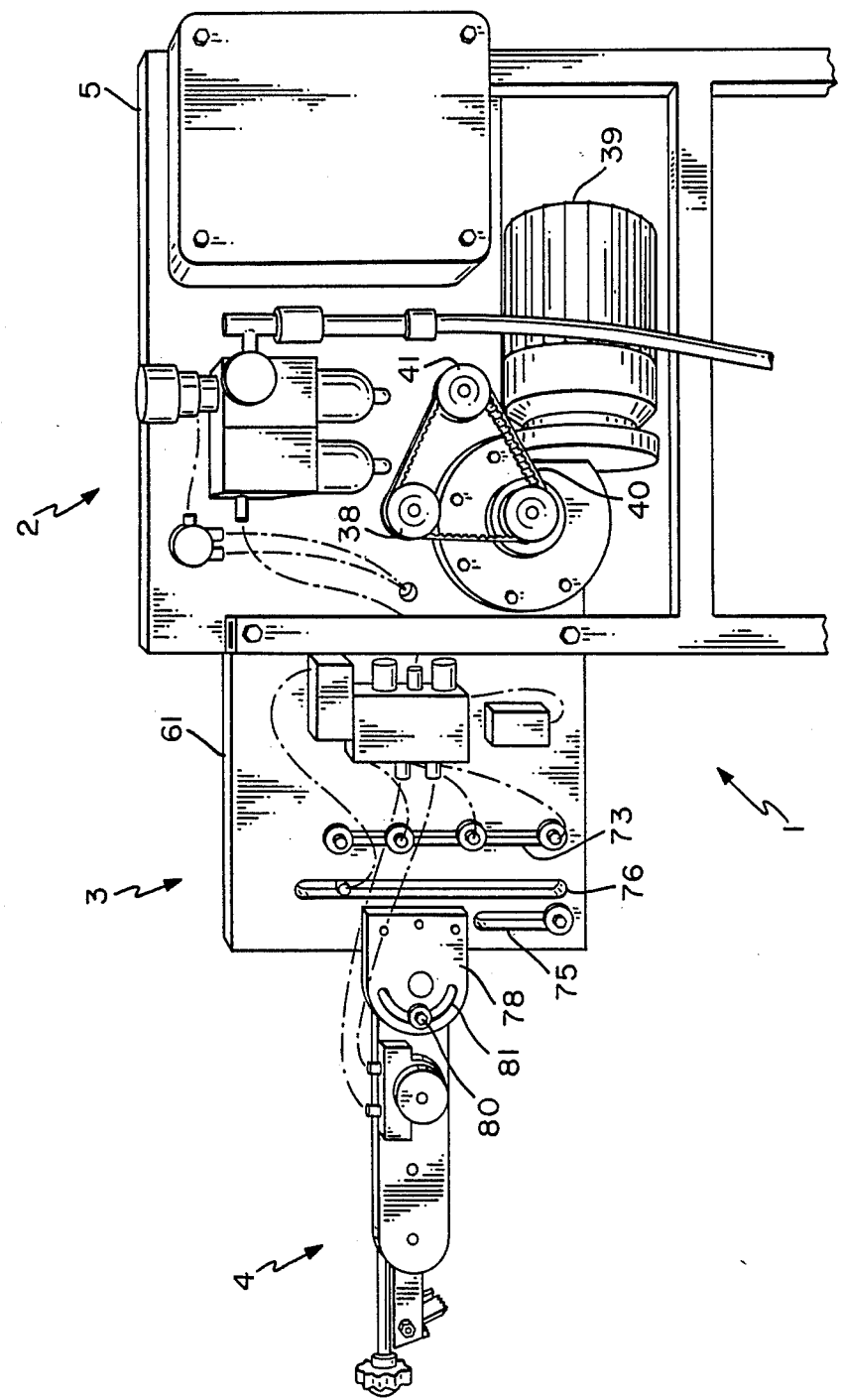
FIG. 2 is a rear perspective view of the apparatus of FIG. 1, in a different operational position.
Figure 3:
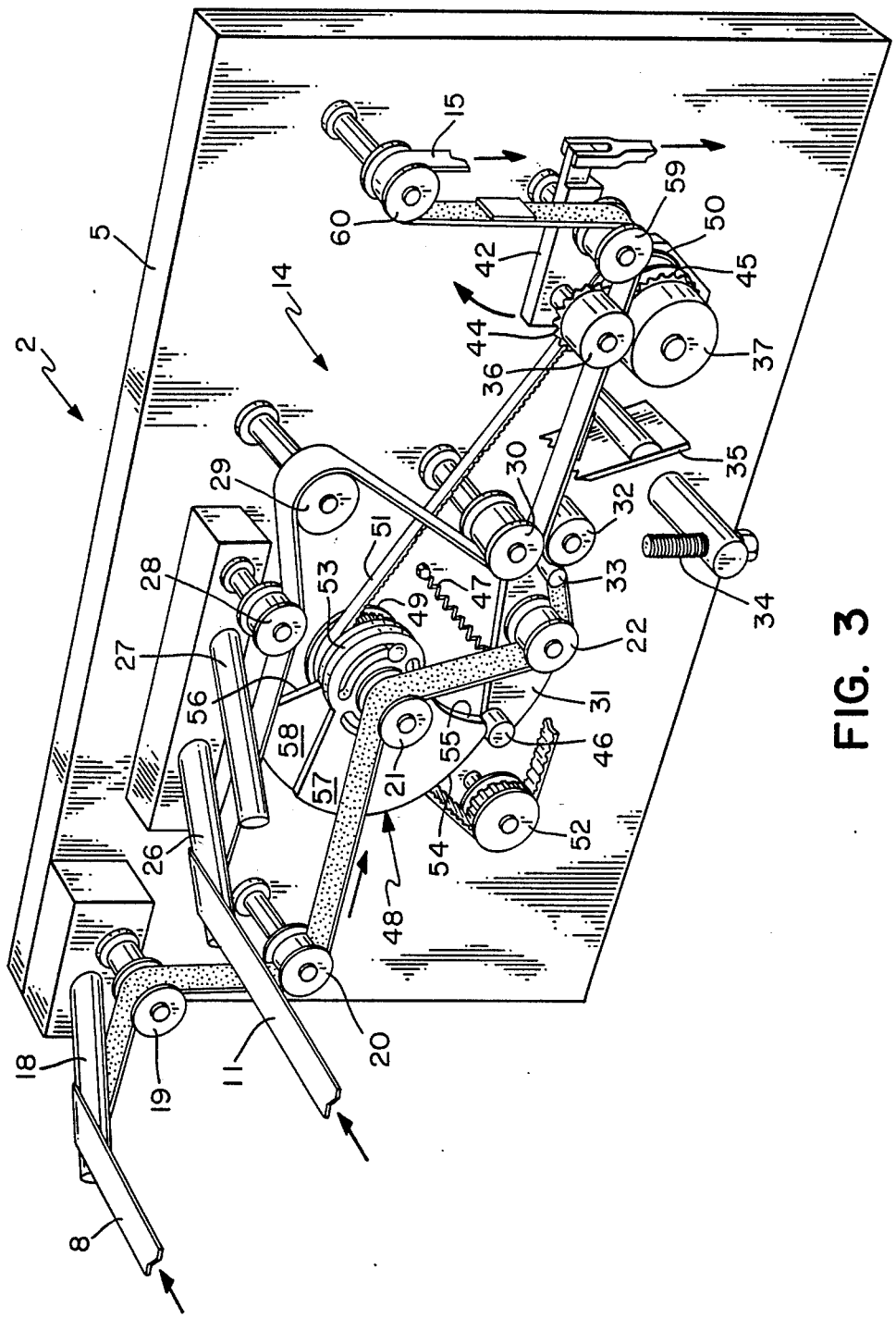
FIG. 3 is a perspective view of a detail of the apparatus of FIG. 1, in an enlarged scale.
Figure 4:
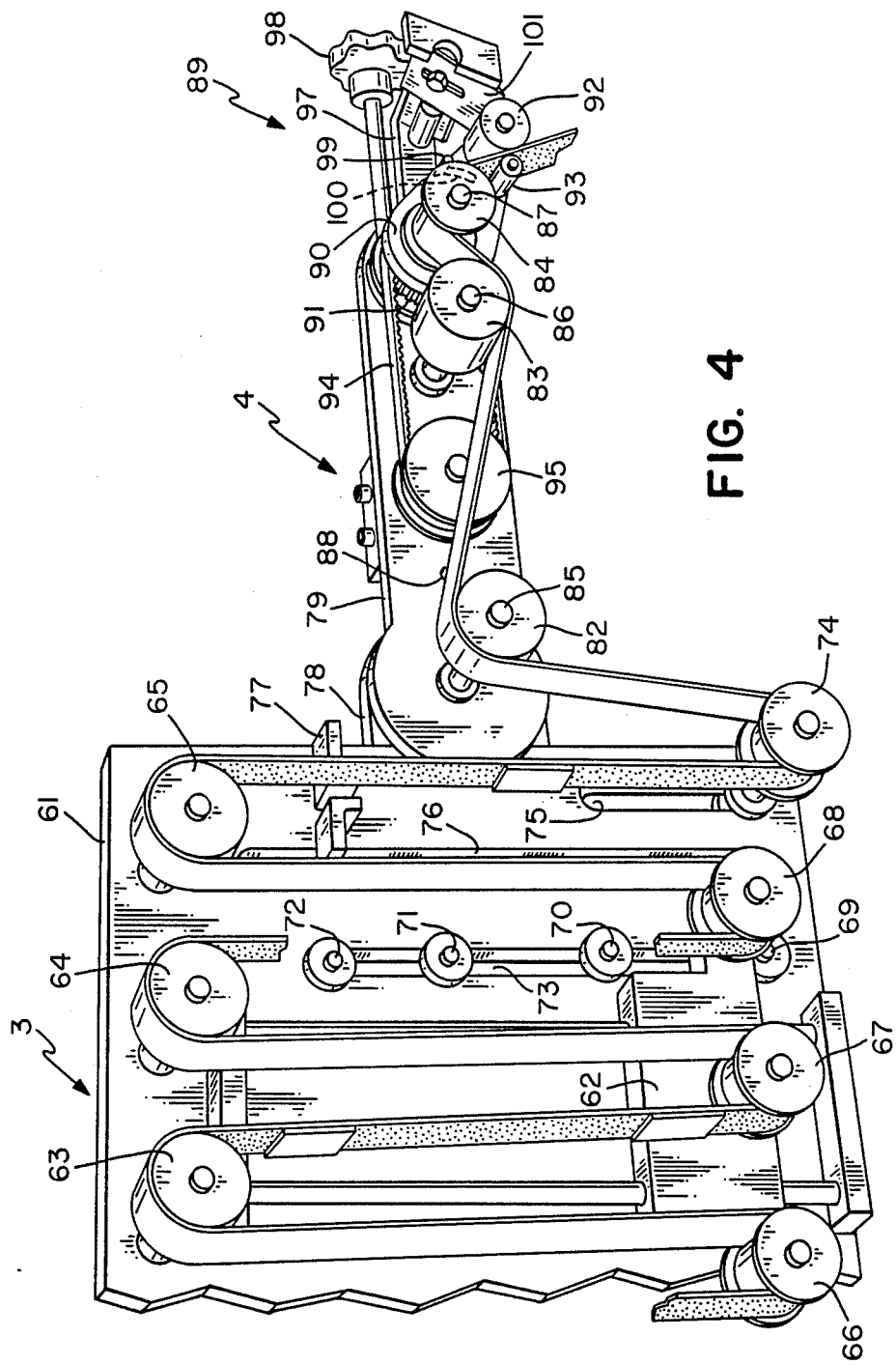
FIG. 4 is a perspective view of another detail of the apparatus of FIG. 1, in an enlarged scale.
Figure 7:
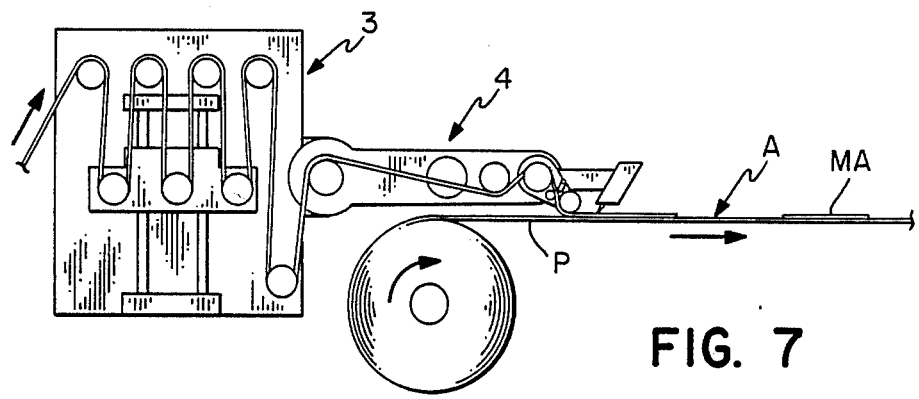
FIGS. 7 and 8 are front, partial and schematic views of the apparatus of FIG. 1 coupled with a packing machine.
Figure 8:
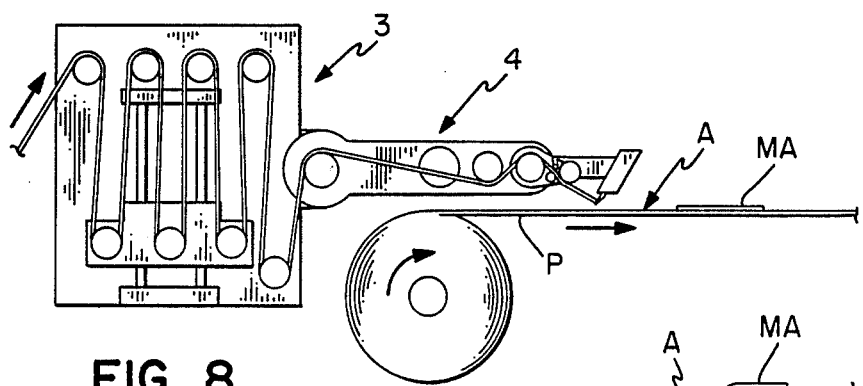
Figure 9:
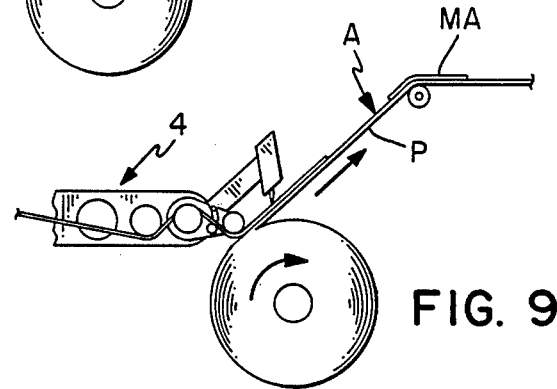
FIG. 9 is a view similar to that of FIG. 7, where the apparatus of FIG. 1 is coupled to a different packing machine.

When the packing machine sends a handle request signal, the control central station provides for the activation of actuator 96 which makes toothed pulley 95 to rotate (in clockwise direction with respect to FIG. 4) together with toothed pulley 91. The rotation of pulley 91 lowers bar 90 with roller 92 against heat-shrinkable film P in the beginning portion A of the packing machine.

The handle tape 15 is then applied to film P which trails it by taking it out from storing unit 3. This action goes on till sensor 77 signals to central station that a complete stripe of type 15, i.e. a handle (shown with MA in FIGS. from 7 to 11), has passed. This signal is obtained in a particularly easy way if adhesive tape 11 is transparent and paper tape 8 is not. In this case, sensor 77 is a mere photocell which detects the passage of the paper tape 8 portions.

It is worth noting that it is just storing unit 3 that allows film P to trail handle tape 15 on itself, without running the risk of breaking. The mechanical resistances met by the handle tape 15 trailed by film P result in fact to be only the rolling friction of the various rollers (which are very low) and the weight of slide 62 (which results to be anyhow distributed among the different loops: in apparatus 1, as shown, the tensile stress transmitted to tape 15 is equal to one sixth the weight of slide 62).

When sensor 77 signals that a complete stripe has passed, central station activates actuator 96 contrarywise, thus causing bar 90 to be raised. In this way the contact between roller 93 and stake 99 stops the trailing of handle tape 15 which, once raised by roller 93 and stretched by film P which keeps on moving forward, enters in contact with blade 101 and is cut. A handle MA results to be applied to film P which is then wound on a load F.

The operation cycle described above is repeated whenever a handle request signal is sent by the packing machine.

The storing unit 3 continues to provide the quantity of tape 15 required by the applying unit 4 till it is empty; after that the feeding unit 2 is activated.

More precisely, motor 39 is activated which causes toothed pulley 38 to rotate by means of toothed belt 40. Together with pulley 38, there are set in rotation roller 37, toothed pulley 50 and crown gear 45; crown gear 45 sets in rotation roller 36 by means of the other crown gear 44, while pulley 50 sets in rotation toothed pulley 49 and cam 48 by means of toothed belt 51. Till follower roller 46 is engaged with the lowered portion 53 of cam 48, rollers 36 and 37 trail handle tape 15 (and adhesive tape 11), while paper tape 8 remains still.

When follower roller 46 meets the raising portion 56 of cam 48, rocker 31 is moved towards the working position. The applying roller 32 is thus pressed against support roller 30 and paper tape 8 is sticked to adhesive tape 11. From this moment on, paper tape 8 too is trailed together with adhesive tape 11 till roller 46 is engaged with the raised portion 54 of cam 48.

When roller 46 meets the lowering portion 55, rocker 31 is moved towards the rest position; roller 32 strikes against brake bumper 34 which stops its rotation, and therefore prevents the paper tape 8 feeding. Consequently, paper tape 8 is stretched against blade 35 and is cut. The handle tape 15 is thus obtained, consisting of adhesive tape 11 with paper tape 8 portions applied thereto at regular intervals; in other words, tape 15 thus produced results to consist of consecutive stripes each having a non-adhesive central portion (corresponding to the paper tape 8 portion) and two adhesive end portions.

The above described operation cycle is continuously repeated till storing unit 3 is again "filled up".

Since the application speed of unit 4 may be very high (a hundred handles per minute and more), storing unit 3 does not work actually just between a minimum and a maximum, controlling the working of the feeding unit 2. In fact, normally unit 2 is always working at a normal rate, corresponding to the normal working rate of applying unit 4. Under these conditions, there is no tape 15 piling up in unit 3, which is merely used as a mechanical uncoupler between units 2 and 4. The position of movable slide 62, in this case, is intermediate between two sensors 70 and 71.

If the application rate of unit 4 increases (because film P runs more speedy), storing unit 3 tends to become empty and therefore slide 62 is raised. When it reaches sensor 71, the central station actuates a speed increase of motor 39, corresponding to an accelerated rate of unit 2.

If, however, the application rate of unit 4 is still higher than the production rate of unit 2, slide 62 rises more and more up to sensor 72 which, once reached, emits an alarm signal which stops the plant.

If, on the contrary (as normally occurring), the accelerated production rate of unit 2 is higher than the rate of unit 4, slide 62 lowers to sensor 70 which slows down motor 39, thus reaching again the normal production rate.

If the application rate of unit 4 is slower than the normal production rate of unit 2, slide 62 reaches sensor 69 which stops unit 2; such a unit is restarted, at a normal rate, only when sensor 70 is again reached.

The vertical position of the four sensors 69–72 can be registered along slit 73 to meet different needs. Alternatively, the sensors may be fewer in number to control a one-speed motor, or more in number (or even be replaced with a single linear sensor) to control a variable-speed motor.

The intermittent feeding of paper tape 8 makes advisable the presence on the motion path of a shock-absorbing element, such as roller 16 on arm 23, in order to avoid the risk of tearing the paper itself.

The approaching of the end of the roll of the paper tape 7 or adhesive tape 10 is signalled by photocells 12; when one of the rolls reaches a preset minimum diameter, a pre-alarm signalling (not shown) is activated; this signalling can have different characteristics according to specifical needs. After such a signal, if no intervention occurs, central station stops the whole plant after having counted (by means of sensor 77) a pre-set number of handles.

The apparatus 1 can be submitted to several adjustments which increase its versatility.

Arm 79 and applying head 89 can be both placed independently with respect to apparatus 1 such that they can easily fit to any packing machine.

Arm 79 can be registered by loosening screw 80, rotating arm 79 itself with respect to plate 78 to the desired position and tightening the screw 80 again.

Head 89 can be registered by loosening first knob 98, rotating small arm 97 to the desired position and tightening knob 98 again; bar 90 is then to be re-placed by disengaging toothed belt 94 from one of pulleys 91 or 95. The position of bar 90 must be such that, in the raised position, roller 93 on bar 90 leans against stake 99 on small arm 97.

It is worth noticing that a variation of the position of arm 79 and/or head 89 generally makes a registration of the position of sensor 77 necessary in order to take into consideration the possible variation of the path length for tape 15.

Another registration, already mentioned hereinbefore, is that referring to the possibility of varying the shape of cam 48 by varying the reciprocal position of the two discs 57 and 58 to obtain tape stripes with a more or less long non-adhesive central portion. It is also possible to vary the total length of each tape stripe by changing the transmission ratio between pulleys 49 and 50, e.g. by replacing one of such pulleys with one having a different tooth number.

It has been mentioned already even the possibility of varying the position of the four sensors 69, 70, 71 and 72 to make storing unit 3 working in the most suitable way to the specific application.

The above mentioned registrations build up a remarkable advantage of the apparatus according to the invention since they allow an easy use thereof in any packing machine.

Another remarkable advantage is to be found in the extremely reduced dimensions of the apparatus itself and in particular of its applying unit; this allows the apparatus to be optimally placed in an easy way even in already existing packing machines and not originally pre-arranged for such an apparatus. If necessary, it is possible even to separate unit 1 (which is the biggest) from units 3 and 4, which can be thus placed in narrower positions.

I claim:

1. An apparatus for applying non-shrinkable tape strips each having a non-adhesive central portion and adhesive end portion to a shrinkable film, said film being intended to be wound and shrunk around loads for which said strips will constitute respective carrying handles, comprising:
    a feeding unit, including a support frame, means for providing a handle tape comprising a series of consecutive strips, means which define a motion path of the handle tape, and drive means for pulling the handle tape along its motion path,
    a storing unit, in which the handle tape fed along its motion path on the feeding unit is received, including a support frame, means which define a motion path of the handle tape, and means for detecting the amount of stored handle tape and for consequently controlling the feeding unit,
    an applying unit, including a support frame, means which define a motion path of the handle tape, and a head for applying the handle tape to the shrinkable film while it is moving in such a way that the handle tape is pulled by the film and taken from the storing unit and means for cutting the handle tape, separating a tape strip which remains adhered to the film and is adapted to constitute a handle after shrinking of the film itself, and
    said head on the applying unit being controlled for cutting the handle tape by sensing means activated by passing of a tape strip.

2. An apparatus according to claim 1, characterized by the fact that said means for providing handle tape on the feeding unit comprise:
    a support for a paper tape roll,
    a support for an adhesive tape roll,
    means defining a motion path of the paper tape,
    means defining a motion path of the adhesive tape, and
    a coupling station of the paper tape to the adhesive tape, for making the handle tape.

3. An apparatus according to claim 2, characterized by the fact that the motion path of the handle tape on the feeding unit is defined by two rollers mounted on the support frame.

4. An apparatus according to claim 2, characterized by the fact that the motion path of the paper tape on the feeding unit is defined by:
    two rollers, mounted on the support for the paper tape roll,
    a converting pin, mounted at 45 degrees on the support frame for deviating by 90 degrees the paper tape, and
    four rollers, mounted on the support frame.

5. An apparatus according to claim 2, characterized by the fact that the motion path of the adhesive tape on the feeding unit is defined by:
    a roller, mounted on the support for the adhesive tape roll,
    a converting pin, mounted at 45 degrees on the support frame for deviating by 90 degrees the adhesive tape, and
    two rollers, mounted on the support frame.

6. An apparatus according to claim 1, characterized by the fact that said storing unit comprises:
    a vertically guided free movable slide on the support frame,
    a first group of stationary rollers rotatively supported by the support frame, and
    a second group of movable rollers rotatively supported by the slide, said motion path of the handle tape in the storing unit being defined by the above rollers.

7. An apparatus according to claim 6, characterized by the fact that said means for detecting the amount of handle tape stored in the storing unit comprise at least a sensor of the vertical position of the slide.

8. An apparatus according to claim 1, characterized by the fact that said applying unit comprises:
    a plate, solidly fixed to the support frame of the storing unit, and an arm, hinged to the plate and fixable thereto in several angular positions, the plate and the arm constituting said support frame of the applying unit, and
    a plurality of rollers defining the motion path of the handle tape on said arm.

9. An apparatus according to claim 8, characterized by the fact that said applying head on the applying unit comprises:
    a bar, rotatively supported by said arm hinged to said plate,
    an applying idle roller mounted on the bar,
    a pressing idle roller mounted on the bar adjacent to the applying roller,
    means for moving said bar between an applying position and a rest position,
    a small arm, which is fixed to the end of said arm besides said bar and may be registerably placed with respect to the arm,
    a brake bumper, mounted on the small arm, for blocking the applying roller and the pressing roller when the bar is in rest position, and
    a blade, mounted on said small arm for cutting strips of handle tape when the bar is moved from the applying position to the rest position.

10. An apparatus according to claim 8, characterized by the fact that said handle tape comprises a transparent adhesive tape with adhering paper tape strips, and by the fact that said sensing means for controlling the head on the applying unit for cutting the handle tape comprise a photo-cell registerably mounted near the handle tape.

* * * * *